United States Patent Office 2,940,991
Patented June 14, 1960

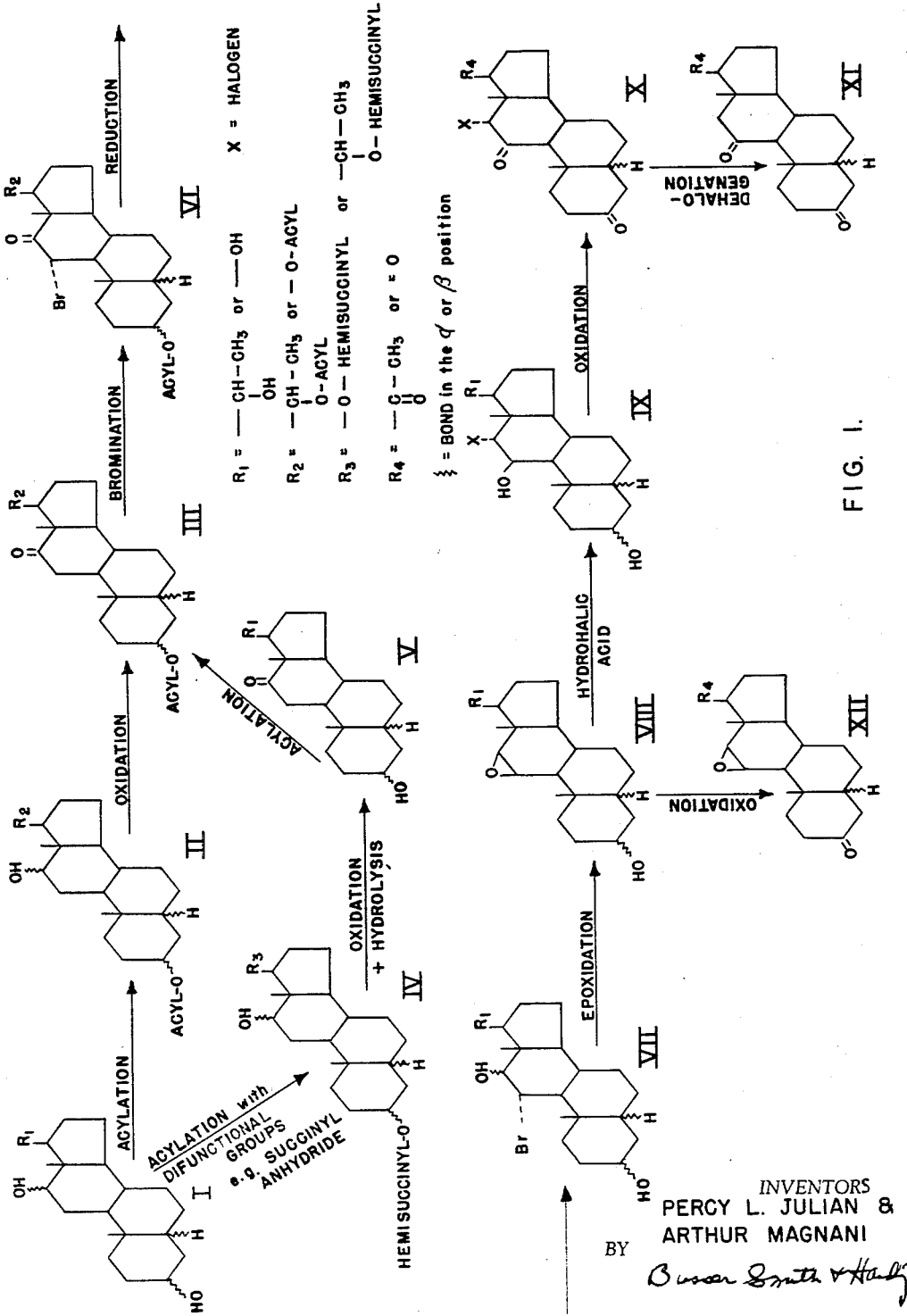
FIG. I.
INVENTORS
PERCY L. JULIAN &
ARTHUR MAGNANI
BY
ATTORNEYS

2,940,991

METHOD OF EPIMERIZING 11-BROMO STEROIDS

Percy L. Julian, Oak Park, and Arthur Magnani, Wilmette, Ill., assignors to The Julian Laboratories, Inc., Franklin Park, Ill., a corporation of Illinois Filed Mar. 1, 1957, Ser. No. 643,353

7 Claims. (Cl. 260—397.45)

This invention relates to novel steroid compounds and to processes for their preparation. The compounds of this invention are particularly useful as intermediates in the preparation of cortical hormones which have useful therapeutic activity.

The cortical hormones, particularly cortisone, hydrocortisone and various derivatives thereof, have found widespread utilization in the treatment of rheumatoid arthritis and related conditions. At present, these cortical hormones are obtained from raw material sources, namely, bile acids and vegetal sterols. In both instances, the problem of converting the starting material, e.g., desoxycholic acid from bile acids, and stigmasterol, smilagenin, diosgenin or hecogenin from vegetal sterols, into a desired intermediate which contains an oxygen function attached to the 11-position of the steroid nucleus has provided a major obstacle due to the complex nature of the synthetic methods involved. The bile acid synthesis of Kendall as well as the microbiological oxidation procedures currently known to the art are laborious and expensive methods for the introduction of the 11 oxygen function. The process of this invention solves this important problem in employing a synthetic route for introducing an oxygen function into the 11-position which employs steps that are carried out in excellent yields.

Similarly, the 17-side chain of the natural products mentioned herebefore, containing a 12-oxygen function, e.g., desoxycholic acid and/or hecogenin, also may be degraded to a 17-oxygen function by methods described in the prior art. The resulting compounds, of course, would be 12-oxygenated testane and androstane derivatives which also could be submitted to the process of this invention (after converting the 17-oxygen to a hydroxy group), thereby converting the 12-oxygen function to the 11-position, and thereby obtaining 3,11,17-triones of value as intermediates.

More specifically, it is a prime object of our invention to provide an improved method for the production of pregnane-3,11,20-trione, allopregnane-3,11,20-trione, androstane-3,11,17-trione and testane-3,11,17-trione from 12-oxygenated sterols in which the side chain attached to ring D has been degraded to a simple substituent in the 17-position. This substituent, which can be, for example, the α-hydroxyethylene moiety or a hydroxyl radical, does not have the disadvantages of the more complex 17-substituents utilized by the processes of the prior art since it does not react under the various steps of the process to form undesirable side products. Furthermore, the degradation of the complex side chain in ring D, for instance the 17-ω-carboxyalkylene moiety of desoxycholic acid or the typical genin moiety of hecogenin, as an early step in the procedure results in an economical advantage over degradation after the 12 to 11 oxygen shift.

It is a further object of our invention to provide novel intermediates and valuable processes useful in the synthesis of cortisone and related compounds from bile acids and hecogenin. Another object of our invention is to provide easy access to other biologically active steroid compounds.

These and other objects of this invention will become apparent on reading the following description in conjunction with the drawings in which:

Figure 1 is a schematic representation of the process in accordance with this invention.

With respect to the following description, it is desired to point out that reduction providing an OH group in the 12-position results in a mixture of compounds, some having the OH bonded by a bond in the α position and some by a bond in the β position. In the starting material triols either the 12α ol or 12β ol compounds or a mixture thereof may be employed. The structural formulas herein and in the claims are intended to cover both the 12α ols and 12β ols where discussed and/or claimed.

It is also desired to point out that the steroid compounds discussed and claimed exist in either the 3α,5β or 3β,5α form. The structural formulas in the description and claims are intended to cover both of these forms.

The starting materials are either well known or obvious to those skilled in the art. The desired pregnane-3α,12α,20β-triol starting material is produced from the known pregnane-3α,12α-diol-20-one diacetate which can be obtained from desoxycholic acid, by reduction of the 20-keto group using either a chemical reducing agent, such as a bimetallic anhydride, for instance sodium borohydride in an aqueous organic solvent, such as aqueous methanol or lithium aluminum hydride in a dry organic solvent, such as ethyl ether or tetrahydrofuran, or catalytically, for instance with hydrogen in the presence of a hydrogenation catalyst, such as Raney nickel in alcoholic solution. The resulting diacetate is hydrolyzed to the 3α,12α,20β triol with an alkaline solution, for instance with potassium hydroxide or sodium hydroxide in aqueous methanol.

The known allopregnane-3β-ol-12,20-dione acetate, obtained from hecogenin by typical genin degradative oxidation of the acetate with chromium oxide, is similarly reduced to give the allopregnane-3β,12α,(β)20-triol starting material. The testane starting material, testane 3α,12α,17β-triol, is produced from pregnane-3α,12α-diol-20-one diacetate by perbenzoic acid oxidation, followed by hydrolysis of the acetate groups. Androstane-3β,12,17-triol is similarly prepared from allopregnane-3β-ol-12,20-dione acetate.

As illustrated in Figure 1, the pregnane, allopregnane, testane or androstane-triol (I) selected, depending upon the end product trione desired, is preferentially oxidized at position 12. Blocking the hydroxyl groups in the 3 and 17 or 20 positions is essential in order to accomplish a clean-cut reaction (to facilitate the following description, "Y" will be used hereinafter to indicate the "17" or "20" position). This is accomplished by blocking these positions with a suitable acyl group, for example, either an aromatic acyl group such as benzoyl, hemiphthalyl or toluyl or by a lower alkanoyl group such as propionyl, butyryl or preferably by an acetyl or hemisuccinyl group. Acylation is accomplished by acylating with the appropriate acyl anhydride or acyl chloride in basic solution such as in an excess of a tertiary amine, for instance pyridine, collidine, or picoline or in an inert solvent such as dimethylformamide, acetone or dimethylacetamide with about one equivalent of an acid binding agent, for instance pyridine, tributylamine or picoline. The resulting 3,12,Yβ-triol-3,Y-diacylate (II) then is oxidized with a suitable oxidizing agent, for example, chromic acid in aqueous acid solution, for example, aqueous acetic acid or chromic oxide in basic solution, for example, in pyridine solution, to form the correspondng 3,Yβ-diol-12-one diacylate (III).

When the 3-Y-blocking acyl groups contain centers reactive under the bromination conditions later employed in the process, it is necessary to hydrolyze the blocking groups after the oxidation step and reacylate to introduce nonreactive blocking groups, preferably acetate. As an example of a blocking group reactive to bromine, the hemidibasic esters are mentioned, for instance the hemisuccinyl and the hemiphthalyl moieties. By way of specific example, the procedure where the hemisuccinyl moiety is employed is as follows: Diacylation with, for example, succinyl anhydride in an excess of tertiary amine, such as pyridine, or in an inert solvent, such as dimethylformamide, acetone or dioxane with an equivalent of acid binding agent, for example, pyridine, tributylamine or picoline, normally first produces a mixture of the mono- and dihemisuccinates. The monohemisuccinate, upon retreatment, produces a further quantity of the dihemisuccinate (IV). The thus formed 3,Y-dihemisuccinate (IV) then is oxidized with an oxidizing agent, as described above, preferably with chromic acid in aqueous acetic acid solution or with chromic oxide in pyridine solution to the desired 3,Y$\beta$-diol-12-one dihemisuccinate. The protective groups in the 3 and Y-positions then are hydrolyzed by alkali, for example, potassium or sodium hydroxide in alcohol, for example, methanol or isopropanol or in an aqueous alcohol mixture, for example, aqueous methanol, ethanol, isopropanol or butanol. The resulting 3,Y$\beta$-diol-12-one (V) can then be diacylated with nonreactive acyl groups inert to bromine (using the same procedure as described above in connection with the 3,Y acylation of 3,12,Y$\beta$-triol (I) to the diacylate (II) to produce the corresponding 3,Y$\beta$-diol-12-one diacylate (III) in which there are no acyl groups reactive during the bromination step. The better yields obtained by using this alternative procedure are due to the favorable solubility characteristics of the hemisuccinate derivatives.

The diacylate (III) containing the inert to bromine 3,Y blocking agents is brominated in an inert organic solvent, for example, chloroform, chloroform-acetic acid or ethylene dichloride by treatment with bromine at moderate temperature, from about 15° C. to about 40° C., preferably at about 25° C. The bromination can be catalyzed by and hence is preferably carried out in the presence of HBr. A mixture of 11$\alpha$ (VI) and 11$\beta$-bromo isomers results. The 11$\alpha$ isomer is required for the formation of the 11,12-epoxide; preferably, therefore, the organic extract from the bromination reaction may be concentrated and the isomers separated by fractional crystallization from, for example, methanol or ethanol. The resulting 11$\alpha$-bromo-3,Y$\beta$-diol-12-one diacylate (VI) then is reduced with a bimetallic hydride in an organic solvent such as sodium borohydride in an aqueous organic solvent inert to reduction, such as aqueous methanol or ethanol, or lithium aluminum hydride in a dry organic solvent, such as diethyl ether, dibutyl ether or tetrahydrofuran at moderate temperatures, preferably from about 15° C. to about 40° C. to form a mixture of the 11$\alpha$-bromo-3,12,Y$\beta$-triol (VII) and its 3,Y acylate. If desired, the mixture of the acylated and free triol can be reacylated using the appropriate acyl anhydride or acyl chloride, for example, those set forth above in connection with the formation of the diacylate compound III in a tertiary base such as pyridine or in an inert solvent such as dimethylformamide, acetone or dioxane employing about one equivalent of an acid binding agent, for example, pyridine, tributylamine or picoline. If desired, the acyl groups can be removed by hydrolysis before the reduction step.

The triol (VII) alone, its 3,Y acylate or a mixture thereof then is converted to the 11$\beta$,12$\beta$-epoxy-3,Y$\beta$-diol (VIII) with a strong dehydrohalogenating agent such as a strong base such as caustic alkali, for example, potassium hydroxide or sodium hydroxide in aqueous methanol, isopropanol or ethanol or such as collidine or such as silver oxide-pyridine. Since only the 12$\alpha$-hydroxy form of the triol VII is converted to the epoxy compound VIII, this form, if desired, can first be separated from the 12$\alpha$-hydroxy and 12$\beta$-hydroxy mixture (VII) by, for example, fractional crystallization.

The thus formed 11$\beta$,12$\beta$-epoxide (VIII) then is reacted with an aqueous hydrohalic acid, for example, hydrobromic, hydrochloric or hydrofluoric acid, in a water-miscible organic solvent, for example, acetone, dioxane or methanol at moderate temperatures, preferably from about 15° C. to about 40° C., to give the 12-halo-3,11$\beta$,Y$\beta$-triol (IX). Similarly, anhydrous hydrogen halides can also be used in anhydrous organic solvents such as, for example, chloroform, ethylene dichloride, glacial acetic acid and the like to form these compounds.

The halohydrin (IX) is treated with a suitable oxidizing agent as described above, for example, chromic acid in an organic solvent acid medium such as chloroform-acetic acid or ethylene dichloride-acetic acid at moderate temperature, preferably from about 15° C. to about 40° C., to give the 12-halo-3,11,Y-trione (X). Exemplary of other oxidizing agents are aluminum isopropoxide or alkaline permanganate.

The 12-halo-3,11,Y-trione (X) then is reacted with a dehalogenating agent, for example, zinc in acetic acid, chromous chloride, aluminum amalgam, hydrogen in the presence of a catalyst such as a palladium catalyst at moderate temperatures, preferably from about 15° C. to about 40° C. to give the desired 3,11,Y-trione (XI). It is apparent to one skilled in the art that with certain of these dehalogenating agents, reduction of the oxo-moieties will occur simultaneously. In such examples the alcohol can be oxidized under conditions described above to the trione. The preferred dehalogenating agent is zinc in acetic acid.

EPIMERIZATION

In practicing the process of this invention, the 11$\alpha$-bromo isomer is necessary as previously noted for formation of the 11,12-epoxide. This isomer may be isolated by fractional crystallization, however, in this case the 11$\beta$-bromo isomer must be either reworked chemically or discarded. A simple method of converting the 11$\beta$-bromo isomer to the necessary 11$\alpha$ isomer is, therefore, of great value.

It has been found possible to epimerize the 11$\beta$-bromo-pregnane-3,20$\beta$-diol-12-one diacylate congeners of Formula VI either by treating a mixture of the 11$\alpha$ and 11$\beta$ bromo compounds or by treating the particular 11$\beta$ isomer obtained by the previously discussed fractional crystallization with a strong acid such as a mineral acid, for example, sulfuric, phosphoric, or preferably a hydrohalic acid, for example, hydrochloric or hydrobromic, or an organic acid, such as phenyl sulfonic acid, p-toluene sulfonic acid or acetic acid. The epimerization is carried out at moderate temperature of about 15° C. to 40° C., preferably at below about 25° C. in an organic solvent, for example, methanol, ethanol, isopropanol, dioxane, dimethylformamide, benzene, chloroform, methylene chloride or tetrahydrofuran. Up to about 85% of the desired 11$\alpha$ isomer is obtained by this procedure. The 11$\alpha$ isomer is isolated and purified, if necessary, by conventional techniques, for example, by precipitation or fractional crystallization. When hydrolytic solvents such as alcoholic solvents or aqueous mixture of solvents, for instance aqueous dioxane or aqueous dimethylformamide are used, the 3,20 protective groups are also hydrolyzed during the epimerization steps in which event 11$\alpha$-bromopregnane-3,20$\beta$-diol-12-one is recovered. If a non-hydrolytic organic solvent such as dry benzene, chloroform, methylene chloride or tetrahydrofuran is used, the acyl groups remain intact and 11$\alpha$-bromopregnane-3,20$\beta$-diol-12-one diacylate is recovered. Irrespective of whether a hydrolytic or non-hydrolytic solvent is used, the resulting product can now be reduced with a bimetallic hydride as previously described with respect to the 11α isomer obtained by fractional crystallization.

OTHER UTILITY OF INTERMEDIATES

The intermediates formed in the above-described process are not only useful in the described process but also have other utility, for example, the 11β,12β-epoxypregnane-3α,20β-diol (VIII) can be used to prepare biologically active steroids, for example, when oxidized by chromic acid, it gives 11β,12β-epoxypregnane-3,20-dione (XII) a potent general anesthetic. Also this intermediate itself (VIII) has useful central nervous system depressant properties such as a gentle sedative activity.

Also, the pregnane diolone diacetate (III) by treatment with hydrazine according to the Huang-Minlon procedure results in the pregnane-diol which upon oxidation give rise to pregnane-3,20-dione in excellent yield. This upon treatment with sodium borohydride gives the 3α-ol-20-one from which Reichstein's substance S, "DOCA," and pregnan-21-ol-3,20-dione, sodiohemisuccinate can be obtained.

Alternatively, pregnane-3α,20β-diol-12-one, diacetate (III) upon selenium dioxide dihydrogenation yields $\Delta^9(11)$-pregnene-3α,20β-diol-12-one diacetate from which the 12-oxo function can be removed according to the Huang-Minlon procedure resulting in 9(11)-pregnene-3α,20β-diol diacetate, which is a useful intermediate, such as in the alternate introduction of the 11-oxygen function according to known procedures.

UTILITY OF END PRODUCT TRIONES

Pregnane-3,11,20-trione has a "DOCA"-like effect of lowering brain excitability and is useful in known procedures for the synthesis of cortisone which is a highly useful anti-inflammatory agent. For example, pregnane-3,11,20-trione can be converted to cortisone by the following steps:

(1) Reduction at 3 with sodium borohydride to form pregnan-3α-ol-11,20-dione.

(2) Acylation of position 3 and introduction of a 17α-hydroxy group by the well-known Gallagher procedure.

(3) The introduction of the 21-hydroxy and 3-keto-$\Delta^4$ moieties as in United States Patent 2,752,339.

Allopregnane-3,11,20-trione is useful in known procedures for the synthesis of the $\Delta^4$ and $\Delta^{1,4}$ congeners in the cortical hormone series, for instance cortisone, hydrocortisone or metacortandracin. Androstane-3,11,17-trione may be similarly converted to these pharmacodynamically active drugs by introducing suitable 17-substituents by known procedures and the $\Delta^4$ moiety, for instance by dibrominating at position 2, rearranging one bromine to position 4, removing the 2-bromo and dehydrohalogenating. The $\Delta^1$ moiety may be introduced by known methods, such as with selenium dioxide or microbiological methods.

Testane-3,11,17-trione is useful to prepare cortisone congeners in the manner set forth above with respect to androstane-3,11,17-trione and by Sarrett's procedure (Natural Products, Fieser, page 450).

The following examples are illustrative of the compounds and processes of this invention. It will be understood that where 12α-ol compounds are set forth, there will be some of the 12β-ol and vice versa if the compounds in question have been reduced. In each case the predominant form is set forth.

EXAMPLE I

REDUCTION OF PREGNANE-3α,12α-DIOL-20-ONE DIACETATE (a) *Catalytic hydrogenation.*—A stream of hydrogen is passed into a magnetically agitated mixture consisting of 9 g. of pregnane-3α,12α-diol-20-one diacetate [Adams et al., J. Chem. Soc., 1825, (1954)], 90 cc. of methanol, 9 g. of Raney nickel and 0.5 g. of potassium hydroxide. The hydrogen is readily absorbed during about two hours. After two and one-half hours, the uptake of hydrogen substantially ceases and the reaction is considered to be completed. The mixture is filtered and the filtrate diluted with 250 cc. of methanol. After the addition of 8 g. of potassium hydroxide, the mass is heated under reflux for two hours to effect the hydrolysis of the acetate groups. The solution is concentrated to a low volume and then water is added. The slurry is extracted with ether and the ether concentrated to obtain a first crop of 3.9 g. of pregnane-3α,12α,20β-triol, M.P. 232–5° C. An additional quantity, 3 g. of product melting at 228 to 232° C., is obtained from the mother liquor.

(b) *Chemical reduction.*—Fifty grams of pregnane-3α,12α, diol-20-one diacetate in 350 cc. of methanol, together with 3 g. of sodium bicarbonate dissolved in 25 cc. of water are stirred and warmed to 30° C. A solution of 3 g. of sodium borohydride in 20 cc. of water is added over a 15-minute period. After stirring for one hour, 20 g. of potassium hydroxide is added and the mixture is heated under reflux for 15 minutes, and the insoluble precipitate is removed by filtration. The filtrate is refluxed for one hour. It is then concentrated to incipient crystallization and the residue cooled. The slurry is filtered to obtain 32 g. of pregnane-3α,12α,20β-triol, M.P., 232–236° C. From the filtrate an additional 2.5 g. M.P. 230–234° C. are obtained by extracting with ether and crystallizing from acetone.

EXAMPLE II

OXIDATION OF THE TRIOL

A mixture consisting of 40 g. of pregnane-3α,12α,20β-triol prepared as in Example I, 100 cc. of pyridine, 200 cc. of methylene chloride and 40 g. of succinic anhydride is heated at reflux for six hours. Then after most of the methylene chloride has been distilled in vacuo and 1 liter of ether added to the residue, the resulting mass is washed with water, aqueous hydrochloric acid and water. The washed solution is concentrated to a low volume and the slurry filtered. The solid is washed with ether and air dried. The product, 28 g. melts at 182° to 185° C. with preliminary shrinking between 130° and 140° C. indicating a transition phenomenon.

The mother liquor on evaporation to dryness yields a solid product which is mono-hemisuccinate. This upon retreatment with succinic anhydride, pyridine and methylene chloride yields an additional quantity of di-hemisuccinate (24.4 g.).

The crude ester upon recrystallization from acetone melts at 191° to 192° C.

To a solution of 30 g. of the ester in 120 cc. of glacial acetic acid, a solution of 6 g. of chromic oxide in 12 cc. of water and 30 cc. of acetic acid is added during 10 minutes while cooling the mixture. The mass is agitated for two hours at about 25° C. After the addition of water, the mixture is extracted with ether and the extract washed with water. A portion of the washed extract upon concentration and long standing slowly crystallizes giving pregnane-3α,20β-diol-12-one, dihemisuccinate, M.P. 180° to 182° C.

The ether is distilled from the balance of the extract and to the residue 150 cc. of methanol and 18 g. of potassium hydroxide in 15 cc. of water are added. The mixture is refluxed for two hours and then methanol is removed (by distillation), whereby the free diol-one crystallizes. The slurry is cooled, diluted with water and filtered. The product melts at 215° to 220° C.

EXAMPLE III

ACETYLATION OF PREGNANE-3α,20β-DIOL-12-ONE (a) *Using pyridine.*—A mixture of 920 mg. of pregnane-3α,20β-diol-12-one, prepared as in Example II above, 4 cc. of pyridine and 4 cc. of acetic anhydride is heated on a steam bath for three hours. Thereafter, the excess acetic anhydride is decomposed by the addition of water. The oil which appears is redissolved in the hot mixture which upon cooling, deposits a crystalline solid. The mixture is extracted with ether. The ether extracts are washed with dilute hydrochloric acid, water, dilute caustic soda and finally with water. The washed extract is dried over anhydrous sodium sulfate and then concentrated to a low volume. Upon the addition of petroleum ether, the product crystallizes. The slurry is filtered to give the solid, pregnane-3α,20β-diol-12-one diacetate, 720 mg., M.P. 135–7° C. A further quantity is obtained from the mother liquor.

(b) *Using perchloric acid.*—To a solution of 15 g. of pregnane-3α,20β-diol-12-one prepared as in Example II above, in 15 cc. acetic anhydride and 30 cc. of glacial acetic acid, 2 drops of perchloric acid is added. The mixture is cooled to control the exothermic reaction and permitted to stand at about 25° C. for about 45 minutes. After the addition of water, the product is extracted with ether and the extract washed with water, aqueous sodium bicarbonate and finally with water. After drying the washed extract, the mass is concentrated and the product crystallizes from a mixture of ether-petroleum ether. Thereby pregnane-3α,20β-diol-12-one diacetate, M.P. 135–7° C. is obtained.

EXAMPLE IV

12-KETO DIACETATE VIA TRIOL DIACETATE

A mixture consisting of 50 g. of pregnane-3α,12α,20β-triol, prepared as described in Example I above, 125 cc. of pyridine and 40 cc. of acetic anhydride is agitated for ten minutes and then 10 cc. additional of acetic anhydride added. The agitation is continued for one-half hour, or until the dissolution of the solid is completed. The solution is permitted to stand for one-half hour and 5 cc. of acetic anhydride is added, followed one-half hour later by a further addition of 5 cc. of acetic anhydride. The mass is permitted to stand for about 16 hours, then the mixture is diluted with water to a volume of about 2 liters. The crystalline slurry is filtered and the filter cake is redissolved in ether. The ether solution is washed with dilute hydrochloric acid, water, dilute aqueous caustic soda and finally with water. The washed ether solution is evaporated to dryness and the residue recrystallized from 80% methanol. A first crop of 30.5 g. of pregnane-3α,12α,20β-triol 3,20 diacetate, M.P. 125–130° C. is obtained.

A solution prepared by warming 45 g. of the pregnane-3α,12α,20β-triol 3,20 diacetate, prepared as above, in 180 cc. of acetic acid is permitted to cool. A mixture of 15 g. of chromic acid in 20 cc. of water and 40 cc. of acetic acid is added to this slurry in portions over a 20-minute period. The mass is agitated for three hours at ambient temperature and then diluted with water. The mixture is extracted with ether. The ethereal extract is washed with water, aqueous sodium bicarbonate and finally with water. The washed solution is evaporated to dryness and the residue redissolved in anhydrous ether. The solution is concentrated to a low volume. The addition of petroleum ether causes the crystallization of 35.3 g. of pregnane-3α,20β-diol-12-one diacetate, M.P., 125–130° C.

The crude product after recrystallization from hexane gives material crystallizing in the form of needles, M.P., 130–136° C.

EXAMPLE V

BROMINATION OF PREGNANE-3α,20β-DIOL-12-ONE DIACETATE FOLLOWED BY EPIMERIZATION-HYDROLYSIS TO GIVE 11α-BROMOPREGNANE-3α,20β-DIOL-12-ONE

To a solution of 3,188 g. of pregnane-3α,20β-diol-12-one diacetate, prepared as in Examples III or IV above, in 14,750 l. of dry chloroform, 5 cc. of bromine and 80 ml. of 20% hydrogen bromide in glacial acetic acid is added to initiate the bromination reaction. Thereafter the balance of the bromination charge (1,243 g.) is added over a 50-minute period. After the completion of the addition of bromine, the mass is permitted to stand for about 10 to 20 minutes.

Two such bromination masses are combined and washed with water. After the addition of approximately 1500 cc. of saturated aqueous sodium bicarbonate, the resultant slightly alkaline mass is decolored by the addition of 1200 ml. of 10% aqueous sodium sulfite. The mixture is washed with water until the aqueous wash liquid is neutral to litmus.

The neutral aqueous chloroform solution is concentrated to incipient crystallization. Then 22 l. of methanol are added to the syrup. The mixture is distilled to remove about 5 l. of distillate. The distilland is agitated and cooled to 30° C. A solution of 1590 g. of hydrogen chloride dissolved in 8,550 ml. of methanol is added to the mass. The mixture almost immediately sets to a crystalline mush which, upon being agitated, gradually dissolves. The temperature of the resultant solution rises to 35° C. The mass is cooled to below 10° C. and held at this temperature for at least 24 hours. The resultant slurry is filtered and the filter cake washed with methanol. The washed cake is dried in a circulating hot air drier. The product, 11α-bromopregnane-3α,20β-diol-12-one, M.P., 175° C. (dec.), together with a second crop obtained by concentration of the mother liquor to 12 l. volume, 4,744 g. of product is obtained.

The mother liquor, after the separation of the second crop material, contains essentially all of the 11β-bromo isomer together with unchanged starting material and 11α-bromo compound. Treatment of these mother liquors with zinc and acetic acid debrominates the mixture of, giving pregnane-3α,20β-diol-12-one in a form suitable for recycling in this process.

This example illustrates the process step whereby the mixture of 11-bromo compounds is epimerized, in the presence of halogen acid to a mixture comprising a preponderance of the 11α-bromo derivative, and simultaneously hydrolyzes the 3,20-diacetoxy groups. By using instead of methanol, a solvent such as glacial acetic acid, anhydrous ether or acetone, the hydrolysis of the acetate moietus can be prevented and the product isolated as the 11α bromopregnane-3α,20β-diol-12-one diacetate.

We find it possible to isolate up to 85% yield of 11α-bromo compound from such an epimerization reaction. Initially on bromination, the ratio of isomers produced is about 60% α and 40% β isomers. This epimerization is demonstrated by reaction of either epimer in the pure state with halogen acid to yield a mixture from which up to 85% of the 11α-bromo epimer can be isolated.

EXAMPLE VI

REDUCTION OF 11α-BROMOPREGNANE-3α,20β-DIOL-12-ONE AND CLOSURE TO 11,12-EPOXIDE

A slurry of 10 g. of finely ground 11α-bromopregnane-3α,20β-diol-12-one, prepared as in Example V above, in 100 cc. of methanol is warmed to 35° C., and 0.5 g. of sodium borohydride in 5 cc. of water is added. The heat of reaction causes the temperature to rise to 45° C. at which temperature complete solution occurs. After several minutes, the product begins to crystallize. The mixture is agitated for one-half hour and then 140 cc. of water is slowly added. The slurry is filtered and the filter cake is washed with water. The product, 11α-bromopregnane-3α,12β,20β-triol after drying, weighs 9.7 g., M.P., 203–4° C.

This material is suspended in 80 cc. of methanol containing 4 g. of potassium hydroxide. The mixture is heated at reflux for one-half hour. The solution is concentrated to a low volume and 125 cc. of water added. The slurry is cooled and filtered. The filter cake is washed with water and dried to give 7.8 g. of 11β,12β-epoxypregnane-3α,20β-diol, M.P., 188–192° C. This epoxide can be oxidized with chromic acid to 11β,12β- epoxypregnane-3,20-dione, M.P., 139-142° C., or treated with halogen acids to form the corresponding halohydrins.

EXAMPLE VII

12-BROMOPREGNANE-3α,11β,20β-TRIOL

An aqueous slurry of 40 g. of the epoxide, produced as in Example VI, in 700 cc. of acetone is stirred while 250 cc. of 4 N hydrobromic acid is added. The temperature rose to 42° C. A small amount 3.6 g. of insoluble starting material is filtered from the solution and washed with 300 cc. of acetone. The clarified solution is diluted with 1400 cc. of water slowly, for about two hours. The resultant slurry is filtered. The filter cake is dried in air. The dried product, 12-bromopregnane-3α,11β,20β-triol, melts at 187–9° C. A further quantity is obtained by extraction of the aqueous mother liquor with methylene chloride. Total yield is 45 g. The corresponding chlorohydrin is obtained in an analogous manner using 4 N hydrochloric acid. By treatment of the epoxypregnane diol with aqueous hydrogen fluoride in dioxane the fluorohydrin results.

EXAMPLE VIII

OXIDATION OF THE BROMOHYDRIN FOLLOWED BY DEBROMINATION

A solution of 81 g. of 12 bromopregnane-3α,11β,20β-triol, the product of Example VII, in 240 cc. of methylene chloride is mixed with 320 cc. of glacial acetic acid. The mixture is cooled and maintained at 20–25° C. during the addition of a solution of 60 g. of chromic acid in 80 cc. of water and 80 cc. of acetic acid (20 minutes). The mixture is agitated for two hours and then diluted with water. The mass is extracted with three portions of methylene chloride. The combined extracts are washed with water. The solvent solution is debrominated by the addition of 60 cc. of glacial acetic acid followed by the portionwise addition of 32 g. of zinc. During the latter addition the temperature is permitted to rise to 40° C. The mixture is agitated for 40 minutes, decanted from the spent zinc residue and the solvent solution washed with water. The washed solution is concentrated to about 150 cc. and diluted with 500 cc. of ether. The resultant crystalline slurry is distilled to remove 425 cc. of distillate. The residue is cooled and filtered. The filter cake is washed with ether and dried. In this manner, 42.2 g. of pregnane-3,11,20-trione, M.P., 157–160° C., is obtained.

The resultant trione, by reduction with sodium borohydride by the method of Gallagher et al. [J. Am. Chem. Soc., 75, 2356 (1953)] yields pregnane-3α-ol-11,20-dione. This product is then converted by the method of Gallagher (U.S. Patent No. 2,562,030) to pregnane-3α,17α-diol-11,20-dione-3-acetate which is thereafter converted to cortisone acetate as disclosed in U.S. Patent No. 2,752,339.

EXAMPLE IX

REDUCTION OF 11α-BROMOPREGNANE-3α,20β-DIOL-12-ONE 3,20-DIACETATE (a) *Bromination.*—Pregnane-3α,20β-diol-12-one diacetate (5 g.), made as in Example IV, is dissolved in 25 cc. of chloroform and a portion of the requisite amount, 2.1 g., of bromine dissolved in 5 cc. of chloroform is added, followed by the addition of two drops of methanol. In about five minutes the solution becomes discolored, indicating the reaction of the bromine. The balance of the bromine is added dropwise over a ten-minute interval and the mass is permitted to stand for ten minutes. The mixture is concentrated in vacuo to a low volume. The residue is dissolved in ether. The ether solution is washed with water, aqueous sodium bicarbonate, and a final water wash. The washed solution is dried over anhydrous sodium sulfate. The dried solution is evaporated to a yellow oily residue which is dissolved in 20 cc. of methanol. This solution is permitted to stand and the product fractionally crystallized to obtain 2.05 g. of prisms, M.P., 157–161° C., the 11α-epimer and 1.80 g. of needles, M.P., 151–153° C., essentially the 11β-epimer. The 11α-bromopregnane-3α,20β-diol-12-one 3,20-diacetate is recrystallized from five parts of methanol to yield the pure compound, M.P., 163–5° C.

(b) *Reduction.*—A solution of 1 g. of 11α-bromopregnane-3α,20β-diol-12-one-3,20-diacetate, in 15 cc. of methanol is agitated, as a solution of 300 mg. of sodium bicarbonate in 1.5 cc. of water is added. The resultant crystalline slurry is cooled to about 27° C. and 100 mg. of sodium borohydride dissolved in 0.75 cc. of water is added. The mixture is agitated for two hours during which the crystalline solid goes into solution and shortly thereafter a precipitate forms. The mixture is diluted with water and extracted with ether. The extract is washed with water and then evaporated to dryness. The crude residue, about 1 g. of a white fluffy material, is dissolved in 5 cc. of acetic anhydride and 1 cc. of pyridine. The solution is warmed on a steam bath for one hour, permitted to stand for one hour, and then the excess acetic anhydride is decomposed with water. The mixture is extracted with ether. The extract is washed with dilute hydrochloric acid, water, aqueous sodium bicarbonate, and finally with water. The washed extract is concentrated and the product is crystallized from ether-petroleum ether, yielding 600 mg. of 11α-bromopregnane-3α,12β,20β-triol-3,20-diacetate, M.P., 147–150° C. Upon recrystallization from 90% aqueous methanol, the product melts at 154–6° C.

The bromohydrin so obtained is converted by treatment with alcoholic KOH into the 11β,12β-epoxypregnane-3α,20β-diol.

EXAMPLE X

A solution of 50 g. of allopregnane-3β-ol-12,20-dione acetate, obtained from hecogenin according to known procedures, namely, isomerization, chromic oxide oxidation of the genin side chain and selective hydrogenation, in 400 cc. of methanol is reacted with 7 g. of sodium borohydride in water following the procedure of Example I(b) to give allopregnane-3β,12α,20β-triol.

A mixture of 30 g. of the solid triol and 30 g. of succinic anhydride in 75 cc. of pyridine and 150 cc. of methylene chloride is heated at reflux for five hours. The solvent is removed and the residue is worked up to give the mono and dihemisuccinates as in Example II. The monosuccinate is reworked to give additional disuccinate.

A solution of 30 g. of the crude diester in 125 cc. of glacial acetic acid is oxidized with a solution of 6 g. of chromic oxide in 12 cc. of water at room temperature. After quenching with water and extraction of the 12-ketoester with ether the residue obtained by evaporating the ether is heated at reflux with 18 g. of potassium hydroxide in aqueous methanol. The methanol is evaporated and the resulting solid is water washed, taken through ether and recrystallized to give allopregnane-3β,20β-diol-12-one.

A solution of 20 g. of the ketone in 20 cc. of acetic anhydride and 30 cc. of acetic acid with 2 drops of perchloric acid is allowed to stand at about room temperature for two hours. After working up as in Example III(b), allopregnane-3β,20β-diol-12-one diacetate is obtained. Sixteen grams of this ester in 160 cc. of chloroform are brominated with 6 g. of bromine following the procedure of Example V. The crude product thereof is used to react with methanolic hydrochloric acid at 30 to 35° C. The solid product after recrystallization from aqueous methanol is 11α-bromoallopregnane-3β,20β-diol-12-one.

A mixture of 5 g. of the α-bromo compound in 75 cc. of methanol is mixed with a solution of 0.5 g. of sodium borohydride in 5 cc. of water. The mixture is warmed until the reaction is completed. After two hours at room temperature, the mixture is diluted with 150 cc. of water. The solid, after filtration and drying, is heated at reflux in 50 cc. of methanol with 2 g. of potassium hydroxide. The reaction mixture is allowed to evaporate on the steam bath, then diluted with water to isolate 11β,12β-epoxyallopregnane-3β,20β-diol.

A solution of 1.4 g. of the epoxide in 40 cc. of dioxane is saturated with hydrogen bromide gas. After standing at room temperature for five hours, the mixture is diluted with water to separate a solid which is recrystallized from acetone to yield 12-bromoallopregnane-3β,-11β,20β-triol.

A solution of 4.0 g. of the 12-bromo compound in 30 cc. of methylene chloride and 25 cc. of acetic acid is cooled and reacted with 3.0 g. of chromic acid in 10 cc. of 50% water-acetic acid mixture at room temperature. After four hours of swirling, the reaction mixture is diluted with water and extracted with several portions of methylene chloride. The organic extracts are combined, washed and reacted with 1.8 g. of zinc and 10 cc. of glacial acetic acid. After one hour at room temperature, the organic supernatant liquid is decanted, washed with water, concentrated and diluted with ether. The product, obtained by cooling and filtering the slurry, is 1.5 g. of allopregnane-3,11,20-trione.

EXAMPLE XI

A mixture of 3.1 g. of testane-3α,12α,17β-triol, prepared according to known procedures from pregnane-3α,12α-diol-20-one diacetate, 10 cc. of pyridine and 4.5 g. of succinic anhydride is heated on the steam bath for eight hours. The mixture is permitted to stand for about 16 hours and then diluted with water. The mass is extracted with ether and the extract washed with dilute hydrochloric acid and water. The ether is removed and the residue, 4.9 g., consisting essentially of the 3,17-disuccinate of the testane-3α,12α,17β-triol is oxidized with chromic oxide glacial acetic acid as described in Example IV. The diolone dihemisuccinate, M.P., 162–164° C., is hydrolyzed with methanolic potassium hydroxide to yield testane-3α,17β-diol-12-one, M.P., 238–241° C., which upon recrystallization from methanol is melted at 250–252° C.

This product is acetylated by reaction with 5 cc. of acetic anhydride in the presence of 5 ml. of pyridine to yield the corresponding 3α,17β-diacetate, M.P., 187–189° C.

A solution of 19.5 g. of the diacetate in 80 cc. of methylene chloride is agitated at ambient temperature during the dropwise addition of 8.8 g. of bromine dissolved in 20 cc. of methylene chloride. The reaction is initiated by the addition of 0.4 cc. of 20% hydrogen bromide in acetic acid. The bromination mass is poured into water and sufficient sodium bisulfite added to discharge the excess bromine. The aqueous layer is separated and the solvent solution is washed with aqueous potassium carbonate and with water. The washed solution is concentrated to a volume of about 35 cc. and after dilution with a mixture of 75 cc. of ether and 75 cc. of n-hexane is again concentrated until incipient crystallization. The mass is cooled and filtered. The product, a mixture of the 11α- and 11β-bromotestane-3,17-diol-12-one diacetate, melts between 145 and 160° C.

This mixture of bromoketones is separated by fractional crystallization from methanol to yield colorless, long, flat prisms melting at 164–166° C. with previous sintering at 160° C. which is the predominant 11α-bromo-12-keto-isomer. The less soluble 11β-bromo-12-ketone is obtained as short prisms melting at 181–183° C. (dec.).

A solution of 5 g. of 11α-bromo-testane-3α,17β-diol-12-one diacetate in 50 cc. of methanol is reduced with 0.5 g. of sodium borohydride dissolved in 5 cc. of water. During the addition of the reducing agent (5 minutes), vigorous gas evolution occurs and the temperature of the mixture rises to about 45° C. The mass is permitted to stand for about 25 minutes. Thereafter 2.5 g. of potassium hydroxide is added and the mixture heated to and maintained at its boiling point for 1½ hours. After the addition of 25 cc. of water, the resultant slurry is concentrated to remove 40 cc. of distillate and the residue diluted to 200 cc. with water. The mass is cooled to about 5° C. and filtered. The filter cake is washed with water until neutral and then dried. The crude product, 11β,12β-epoxytestane-3α,17β-diol, contaminated with testane-3,17-diol-12-one, melted at 205–235° C.

The crude product is purified by treatment with Girard's T reagent. The epoxide fraction so obtained melts at 200–210° C. after alkaline purification with 2 g. of potassium hydroxide in 50 ml. of aqueous methanol to regenerate epoxide from any halohydrin formed during treatment with the acetic acid and Girard's T reagent. This product is purified further by recrystallization from methanol.

The epoxide (2 g.) is converted to the 12-bromo-11-hydroxy-testane derivative by treatment with an excess of hydrogen bromide in methanol solution. This product (1 g.) is oxidized with 1 g. chromic acid in 25 ml. of methylene chloride and 75 ml. of dilute acetic acid and debrominated with 1 g. zinc dust all following the procedures outlined above to yield the known testane-3,11,17-trione melting at 134–136° C. after recrystallization from methanol.

EXAMPLE XII

Following the procedure of Example XI, using equivalent amounts of reagents, androstane-3β,12,17-triol, prepared from allopregnane-3β-ol-12,20-dione in known manner, is 3,17-diacylated with acetic anhydride, 12-oxidized with chromic anhydride and brominated at 11 with bromine-chloroform reagent. The purified 11α-bromo-12-one is reduced at the 12-one group with sodium borohydride. The 11β,12β-epoxide is formed by treatment of the 11α-bromo-12β-ol with strong alkali. This epoxide is caused to react with hydrobromic acid solution, and the resulting 11-ol-12-bromo compound is oxidized at 3, 11 and 17 with chromic anhydride and the so-formed bromo trione is debrominated with zinc-acetic acid to give the desired androstane 3,11,17-trione.

What is claimed is:

1. The method of epimerizing a compound having the following formula:

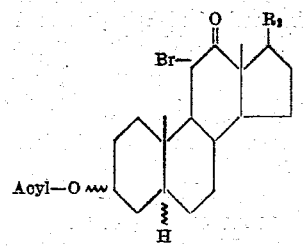

in which $R_2$ is a member selected from the group consisting of

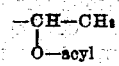

and —O-acyl and ⌇ represents a bond in a position selected from the group consisting of the α-position and the β-position, to form the corresponding α-bromo compound which comprises treating the 11β isomers of the said structural formula with an acid selected from the group consisting of a strong mineral acid and a strong organic acid at a temperature in the range of from about 15° C. to about 40° C.

2. The method in accordance with claim 1 in which the reaction is carried out in a hydrolytic solvent and the ester groups are hydrolyzed.

3. The method in accordance with claim 1 in which the acid is acetic acid.

4. The method in accordance with claim 1 in which the acid is a mineral acid.

5. The method in accordance with claim 4 in which the mineral acid is a hydrohalic acid.

6. The method in accordance with claim 5 in which the hydrohalic acid is hydrochloric acid.

7. The method in accordance with claim 5 in which the hydrohalic acid is hydrobromic acid.

References Cited in the file of this patent

UNITED STATES PATENTS

| | | |
|---|---|---|
| 2,447,325 | Gallagher | Aug. 17, 1948 |
| 2,554,882 | Reichstein | May 29, 1951 |
| 2,782,211 | Wettstein | Feb. 19, 1957 |
| 2,810,734 | Herzog et al. | Oct. 22, 1957 |

OTHER REFERENCES

Meystre et al., Helv. Chim. Acta., vol. 32 (1949), pages 1978–1992. (Pages 1982, 1988, and 1989 necessary.)